(12) United States Patent
Imanari et al.

(10) Patent No.: US 6,554,503 B2
(45) Date of Patent: Apr. 29, 2003

(54) BAYONET MOUNT

(75) Inventors: Hitoshi Imanari, Yokohama (JP);
Masateru Asayama, Kawasakai (JP);
Hidefumi Iinuma, Kawasaki (JP);
Satoshi Hara, Mito (JP)

(73) Assignee: Nikon, Corporation, Tokyo (JP)

( * ) Notice: Subject to any disclaimer, the term of this patent is extended or adjusted under 35 U.S.C. 154(b) by 0 days.

(21) Appl. No.: 09/919,954

(22) Filed: Aug. 2, 2001

(65) Prior Publication Data
US 2001/0053289 A1 Dec. 20, 2001

Related U.S. Application Data

(63) Continuation of application No. PCT/JP00/08924, filed on Dec. 15, 2000.

(30) Foreign Application Priority Data
Dec. 16, 1999 (JP) ............................................. 11-357374

(51) Int. Cl.[7] ............................................. G03B 17/14
(52) U.S. Cl. ....................................... 396/531; 359/828
(58) Field of Search .................................. 396/529, 530, 396/531, 532; 359/828

(56) References Cited

U.S. PATENT DOCUMENTS

| 5,262,899 A | 11/1993 | Iizuka |
| 5,274,413 A | 12/1993 | Nomura et al. |
| 6,089,761 A | * 7/2000 | Sakurai ........................ 396/531 |

FOREIGN PATENT DOCUMENTS

| JP | 50-20653 | 7/1975 |
| JP | 2-82506 | 6/1990 |
| JP | 3-229230 | 10/1991 |
| JP | 3-231726 | 10/1991 |
| JP | 3-236035 | 10/1991 |
| JP | 4-113919 | 10/1992 |
| JP | 6-27520 | 2/1994 |
| JP | 6-36046 | 5/1994 |
| JP | 2000-29116 | 1/2000 |

* cited by examiner

Primary Examiner—Alan A. Mathews

(57) ABSTRACT

A bayonet mount includes a mount main body constituted of resin and a metal member that, at least partially, reinforces a bayonet tab portion at the mount main body.

6 Claims, 10 Drawing Sheets

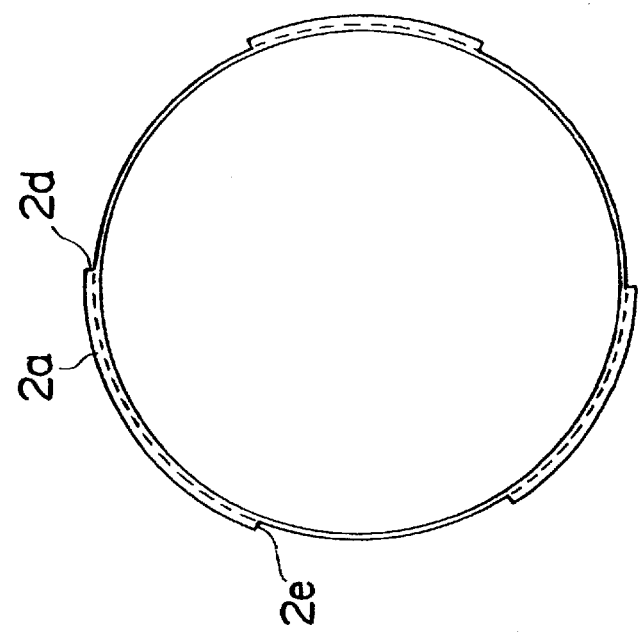
FIG.3C  VIEW FROM CAMERA MAIN BODY SIDE
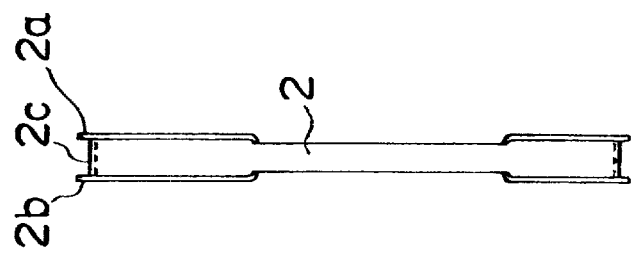
FIG.3B  SIDE ELEVATION
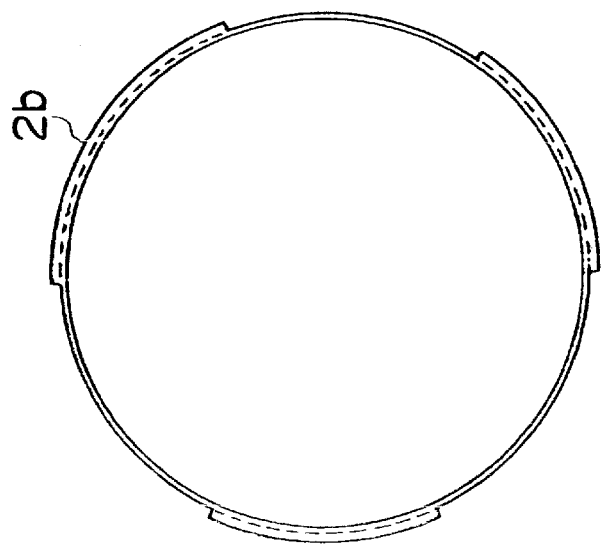
FIG.3A  VIEW FROM LENS SIDE

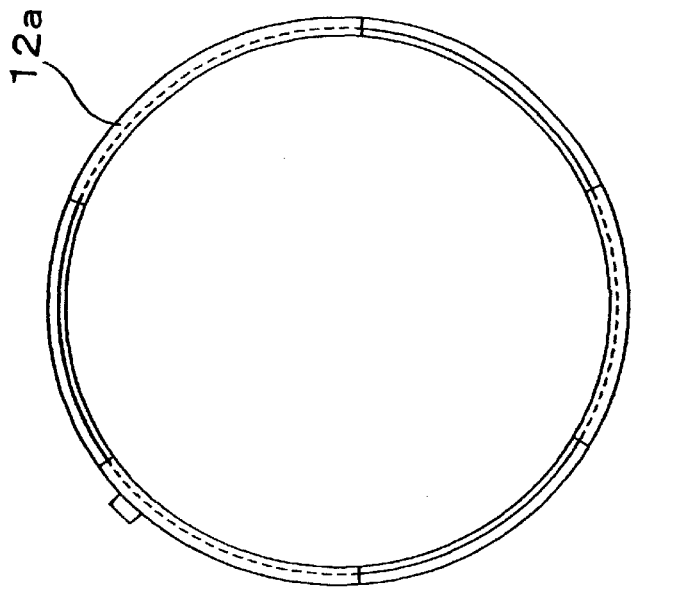
FIG.10A VIEW FROM LENS SIDE
FIG.10B SIDE ELEVATION
FIG.10C VIEW FROM CAMERA MAIN BODY SIDE

BAYONET MOUNT

This application is a continuation of International Application No. PCT/JP00/08924 filed Dec. 15, 2000.

INCORPORATION BY REFERENCE

The disclosures of following applications are herein incorporated by reference: Japanese Patent Application No. H11-357374 filed Dec. 16, 1999; and International Application No. PCT/JP00/08924 filed Dec. 15, 2000.

BACKGROUND OF THE INVENTION

1. Field of the Invention

The present invention relates to a bayonet mount used to fasten a photographic lens, an adapter or the like of a camera such as a single lens reflex camera, an electronic camera, a video camera or the like, which uses interchangeable lenses, to a body.

2. Description of the Related Art

A bayonet mount in the prior art used in a single lens reflex camera or the like is provided with a plurality of tabs projecting out radially from a cylindrical surface both on the side toward the lens and on the side toward the body. By rotating them relative to each other after they are fitted together, the tabs are interlocked, thus fastening the lens to the body.

While a majority of bayonet mounts in the prior art are constituted of metal, the progress achieved in the field of engineering plastics in recent years has enabled production of bayonet mounts through injection molding of a plastic resin.

However, while the metal bayonet mounts in the prior art achieve a high degree of strength, they present a problem in that since the tabs must be formed through a milling process or the like, the production costs are high. While the production costs of plastic bayonet mounts in the prior art, on the other hand, can be kept low, there is a problem in that a plastic bayonet mount failing to achieve a sufficient degree of strength cannot be used in conjunction with lenses or the like with a large dead load since the tabs cannot withstand the load attributable to the weight of the lens and the body.

There is another problem in that as the plastic bayonet mount in the prior art is mounted and dismounted repeatedly, its durability is reduced.

In order to address the problem of insufficient strength of the plastic bayonet mount, the mount disclosed in Japanese Laid-Open Patent Publication No. H 3-229230 (U.S. Pat. No. 5,262,899) achieves a higher degree of rigidity by forming a cylindrical portion extending along the optical axis of the mount as an integrated part. However, while this mount may be adopted in practical application as long as new mount standards are set, it cannot be utilized in conformance to the current standards, since it does not have compatibility with existing products.

In addition, Japanese Laid-Open Patent Publication No. H3-231726 discloses a mount having the area surrounding a mount lock groove constituted of a metal member to compensate for the insufficient strength of the mount lock groove. However, this mount merely addresses the insufficient strength of the mount lock groove, and does not provide a solution to the insufficient strength of the bayonet mount tabs.

SUMMARY OF THE INVENTION

An object of the present invention is to provide a bayonet mount achieving a sufficient degree of strength that can be produced at low cost and a manufacturing method adopted to manufacture the bayonet mount.

In order to attain the above object, a bayonet mount according to the present invention, comprises: a mount main body constituted of resin; and a metal member that, at least partially, reinforces a bayonet tab portion at the mount main body.

In this bayonet mount, it is preferred that: a plurality of bayonet tab portions are provided along a direction of a circumference of the bayonet main body; and the metal member includes a plurality of tab reinforcements for reinforcing the plurality of bayonet tab portions, the plurality of tab reinforcements being formed as an integrated part. In this case, it is preferred that: the metal member includes a plurality of slip-stop portions facing opposite the plurality of tab reinforcements; and the plurality of tab reinforcements and the plurality of slip-stop portions are formed as an integrated unit. Or, it is preferred that: the metal member includes a slip-stop portion facing opposite the plurality of tab reinforcements; and the slip-stop portion is formed continuously along the direction of the circumference of the mount main body.

Also, in any one of above bayonet mounts, it is preferred that: the metal member includes a cylindrical reinforcement formed along a cylindrical shape of the bayonet mount; the plurality of tab reinforcements project out along a radial direction from a central axis of the cylinder at an end surface of the cylindrical reinforcement; and the cylindrical reinforcement and the plurality of tab reinforcements are formed as an integrated unit.

A method according to the present invention for manufacturing a bayonet mount by insert-molding a metal member having a cylindrical reinforcement formed along a cylindrical shape of the bayonet mount and at least one tab reinforcement projecting out along a radial direction from a central axis of the cylindrical shape at an end surface of the cylindrical reinforcement, the cylindrical reinforcement and the tab reinforcement being formed as an integrated unit, comprises: a step in which a position of the metal member relative to a die is regulated by using the cylindrical reinforcement and the tab reinforcement of the metal member; and a step in which a resin is injected after the position of the metal member relative to the die is regulated.

Another method according to the present invention for manufacturing a bayonet mount by insert-molding a metal member having a cylindrical reinforcement formed along a cylindrical shape of the bayonet mount and at least one tab reinforcement projecting out along a radial direction from a central axis of the cylindrical shape at an end surface of the cylindrical reinforcement, the cylindrical reinforcement and the tab reinforcement being formed as an integrated unit, comprises: a radial-direction regulating step in which a position of the metal member relative to a die along a radial direction of the cylindrical shape is regulated by using the cylindrical reinforcement of the metal member; a rotational-direction regulating step in which the position of the metal member relative to the die along a rotational direction around a central axis of the cylindrical shape is regulated by using the tab reinforcement of the metal member; an axial-direction regulating step in which the position of the metal member relative to the die along a direction of the central axis of the cylindrical shape is regulated by using the tab reinforcement of the metal member; and an injecting step in which a resin is injected after the position of the metal member relative to the die is regulated along the radial direction, the rotational direction and the direction of the central axis.

In this method for manufacturing a bayonet mount, it is preferred that the radial-direction regulating step and the axial-direction regulating step are implemented concurrently by using a single member provided at the die.

Also, it is preferred that a bayonet mount according to the present invention is manufactured through the above method for manufacturing a bayonet mount.

Thus, a bayonet mount achieving a high degree of strength at the bayonet tabs can be manufactured with ease at low production cost, as described above. Furthermore, the position of the metal member relative to the mount main body can be set with more ease and with a higher degree of accuracy.

BRIEF DESCRIPTION OF THE DRAWINGS

FIG. 3A shows the reinforcement ring 2 in the first embodiment, viewed from the lens side;

FIG. 3B is a side elevation of the reinforcement ring 2 in the first embodiment;

FIG. 3C shows the reinforcement ring 2 in the first embodiment viewed from the camera main body side;

FIG. 10A shows the reinforcement ring 2 used in a fifth embodiment, viewed from the lens side;

FIG. 10B is a side elevation of the reinforcement ring 2 in the fifth embodiment; and FIG. 10C shows the reinforcement ring 2 in the fifth embodiment viewed from the camera main body side.

DESCRIPTION OF THE PREFERRED EMBODIMENTS (First Embodiment)

Figure 1B:
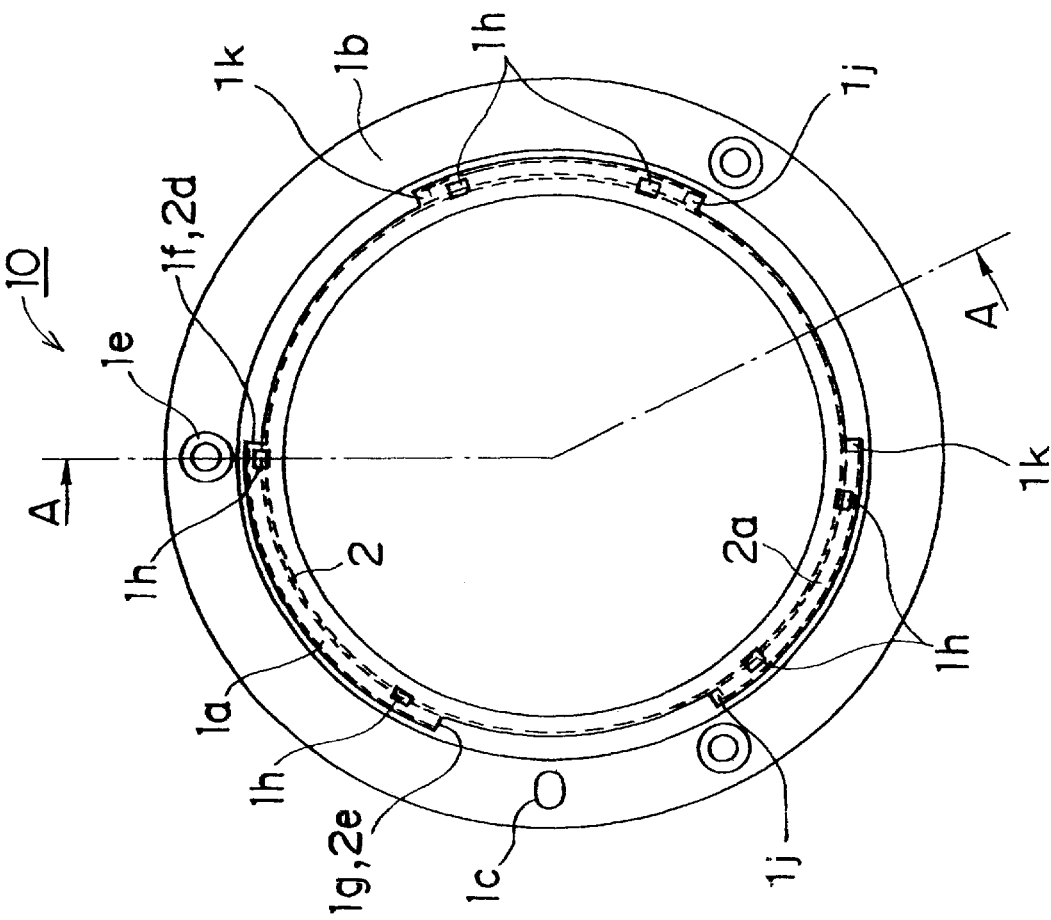
FIG. 1B is a front view of the first embodiment of the bayonet mount 10 according to the present invention.
Figure 1A:
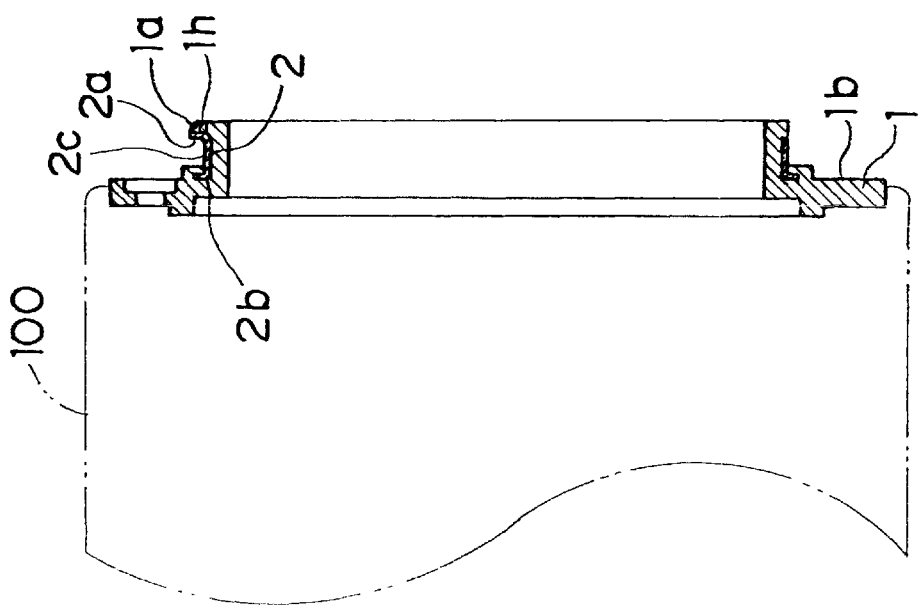
FIG. 1A is a sectional view of a first embodiment of the bayonet mount 10 according to the present invention.
Figure 2:
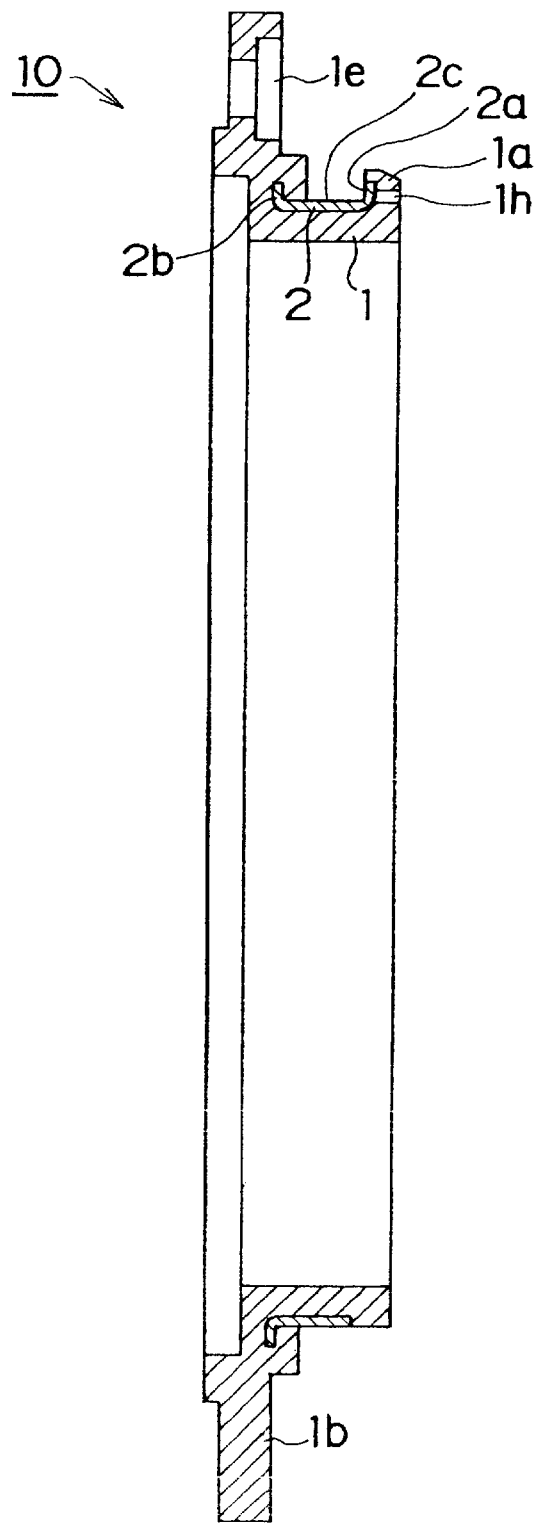
FIG. 2 is an enlargement of FIG. 1A.

FIG. 1 presents a sectional view and a front view of the first embodiment of the bayonet mount 10 according to the present invention. FIG. 1B is a front view of the bayonet mount 10 taken from the side where the camera main body (not shown) is present, whereas FIG. 1A is a sectional view taken along A–A in FIG. 1B. FIG. 2 is an enlargement of FIG. 1A.

The bayonet mount 10, which is provided at an interchangeable lens 100 used in a camera which allows lens exchange, is utilized to mount the interchangeable lens 100 at the camera main body. While a bayonet mount provided at the interchangeable lens 100 is normally referred to as a male bayonet mount and a bayonet mount provided at the camera main body is referred to as a female bayonet mount, a male bayonet mount is simply referred to as a bayonet mount in the following explanation of the embodiment.

The bayonet mount 10 includes a mount main body 1 and a reinforcement ring 2. The material used to form the mount main body 1, which constitutes the main body formed by embedding the reinforcement ring 2 as an integrated part through insert-molding during the molding process, is polycarbonate. The mount main body 1 includes tab portions 1a, a reference surface 1b, a lock groove 1c at which a lock pin (not shown) is inserted for locking when the mount is mounted at the camera main body, spot-facing holes 1e at which a lens barrel 100 and the bayonet mount 10 are secured to each other with screws (not shown) and the like.

In addition, the mount main body 1 includes tab ends 1f and 1g (see FIG. 1B) provided at the two ends of a tab portion 1a, with tab ends 2d and 2e of the reinforcement ring 2 exposed at the tab ends 1f and 1g respectively. The tab ends 2d and 2e are exposed since the tab ends 2d and 2e of the reinforcement ring 2 come into contact with a fixed die 51 when the reinforcement ring 2 is positioned along the rotational direction and the molding process is implemented while sustaining this state (to be detailed later).

The mount main body 1 further includes six holes 1h on camera main body side, which reach the reinforcement ring 2. The holes 1h are left by projecting portions 53a of a fixed-side center core 53 to be detailed later, which are used to hold the reinforcement ring 2 during the molding process.

FIGS. 3A–3C show the reinforcement ring 2. FIG. 3A shows the reinforcement ring 2 viewed from the lens side, FIG. 3B presents a side elevation and FIG. 3C shows the reinforcement ring 2 viewed from the camera main body side. The reinforcement ring 2 includes three tab reinforcements 2a provided on the camera main body side, three slip-stop portions 2b provided on the lens side and a cylindrical portion 2c extending along the cylindrical form of the bayonet mount itself. The tab reinforcements 2a and the slip-stop portions 2b project out (extend) from the end surfaces of the cylindrical portion 2c in a radial direction originating from the central axis (corresponds to the optical axis of the lens) of the cylinder. The reinforcement ring 2, formed by machining stainless steel through press-machining such as drawing, is constituted of an integrated unit which includes the tab reinforcements 2a, the slip-stop portions 2b and the cylindrical portion 2c.

The reinforcement ring 2 is mounted at a die (or mold) when forming the mount main body 1, and is integrated into the mount main body 1 through insert-molding.

(Regulating Position of Reinforcement Ring 2 at Die)

Figure 4A:
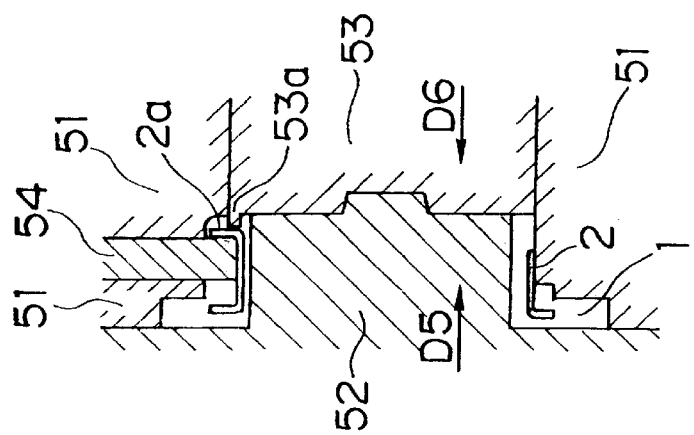
FIGS. 4A–4C illustrate the process through which the position of the reinforcement ring 2 is regulated during the insert-molding process.
Figure 4B:
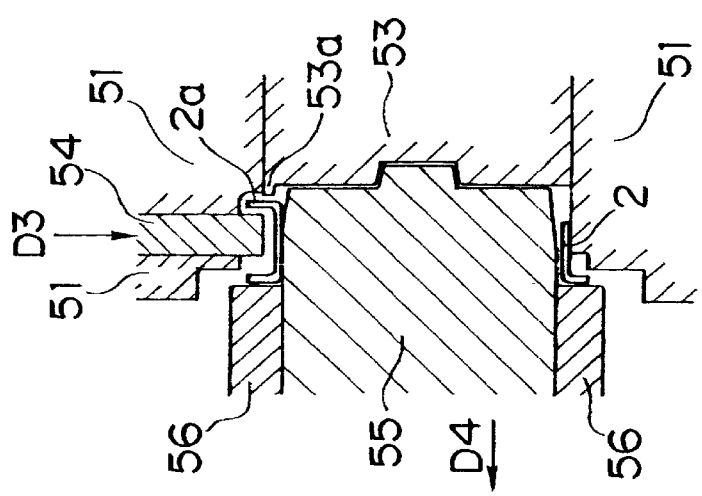
Figure 4C:
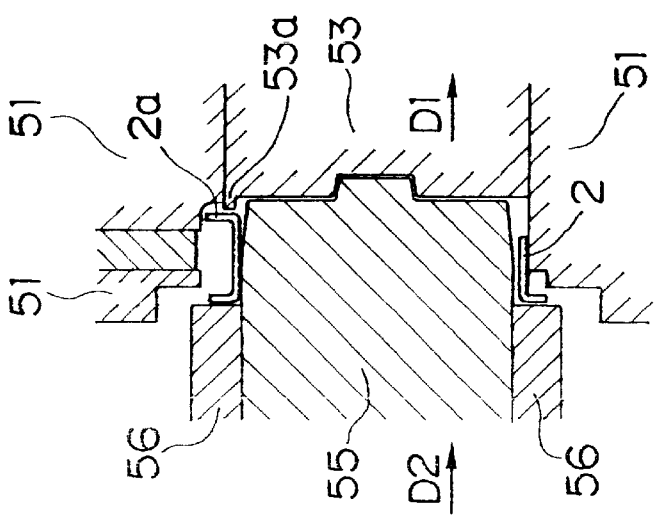

The accuracy of the positional relationship between the mount main body 1 and the reinforcement ring 2 is ensured by accurately regulating the position of the reinforcement ring 2 in the die when mounting the reinforcement ring 2 at the die. FIG. 4 illustrates the process implemented to regulate the position of the reinforcement ring 2 during the insert-molding process, which is started it in the step shown in FIG. 4A and is completed in FIG. 4C.

The die used in the embodiment includes the fixed die 51, a movable die 52, the fixed-side center core 53 and a sliding dies 54, and a mounting tool 55 and a sleeve 56 are also utilized in addition to the individual dies when setting the reinforcement ring 2 at the die.

The following is an explanation of the die operation during the insert-molding process, given by focusing on the method adopted to mount the reinforcement ring 2.

(1) The fixed-side centercore 53 is made to retreat by 0.3 mm along the direction indicated by the arrow D1 while the die is open.

(2) The reinforcement ring 2 is inserted at the mounting tool 55 which is provided with the sleeve 56. The reinforcement ring 2 is inserted at this time by roughly setting its position relative to the mounting tool 55 along the rotational direction with the tab end surfaces 2e and 2d of one of the tab reinforcements 2a. In the embodiment, the upper left tab reinforcement 2a in FIG. 3C is used for this purpose. Then, the reinforcement ring 2 is inserted further inward by 0.3 mm from the home position together with the mounting tool 55 along the direction indicated by the arrow D2. By fitting the tab end surfaces 2e and 2d at tab-shaped portions formed at the fixed die 51 so as to place the tab end surfaces 2e and 2d in contact with the fixed die 51, the position of the reinforcement ring 2 relative to the die along the rotational direction is regulated (FIG. 4A). It is to be noted that the side of the fixed die 51 at which the reinforcement ring 2 is inserted is beveled to allow the reinforcement ring 2 to be inserted smoothly.

(3) The sliding dies 54 are advanced forward along the direction indicated by the arrow D3 by using an air cylinder. The sliding dies 54 regulate the position along the radial direction by holding the cylindrical portion 2c of the reinforcement ring 2 from the external circumference (see FIG. 4B).

(4) By using the sleeve 56, the reinforcement ring 2 is disengaged from the mounting tool 55 and the mounting tool 55 and the sleeve 56 are taken out of the die while leaving the reinforcement ring 2 inside the die.

(5) The die is closed by moving the movable die 52 along the direction indicated by the arrow D5, and the fixed-side center core 53 is moved by 0.3 mm along the direction indicated by the arrow D6. As a result, the position of the reinforcement ring 2 along the direction in which the optical axis extends is regulated with the projecting portion 53a of the fixed-side center core 53 holding the tab reinforcements 2a of the reinforcement ring 2. Since its position is already fixed along the radial direction and the rotational direction, the reinforcement ring 2 thus becomes secured at the specific position relative to the die (see FIG. 4C).

(6) The die is then filled with resin in the state described above to mold the mount main body 1 and the reinforcement ring 2 as an integrated unit, thereby completing the process of manufacturing the bayonet mount 10.

Figure 5:
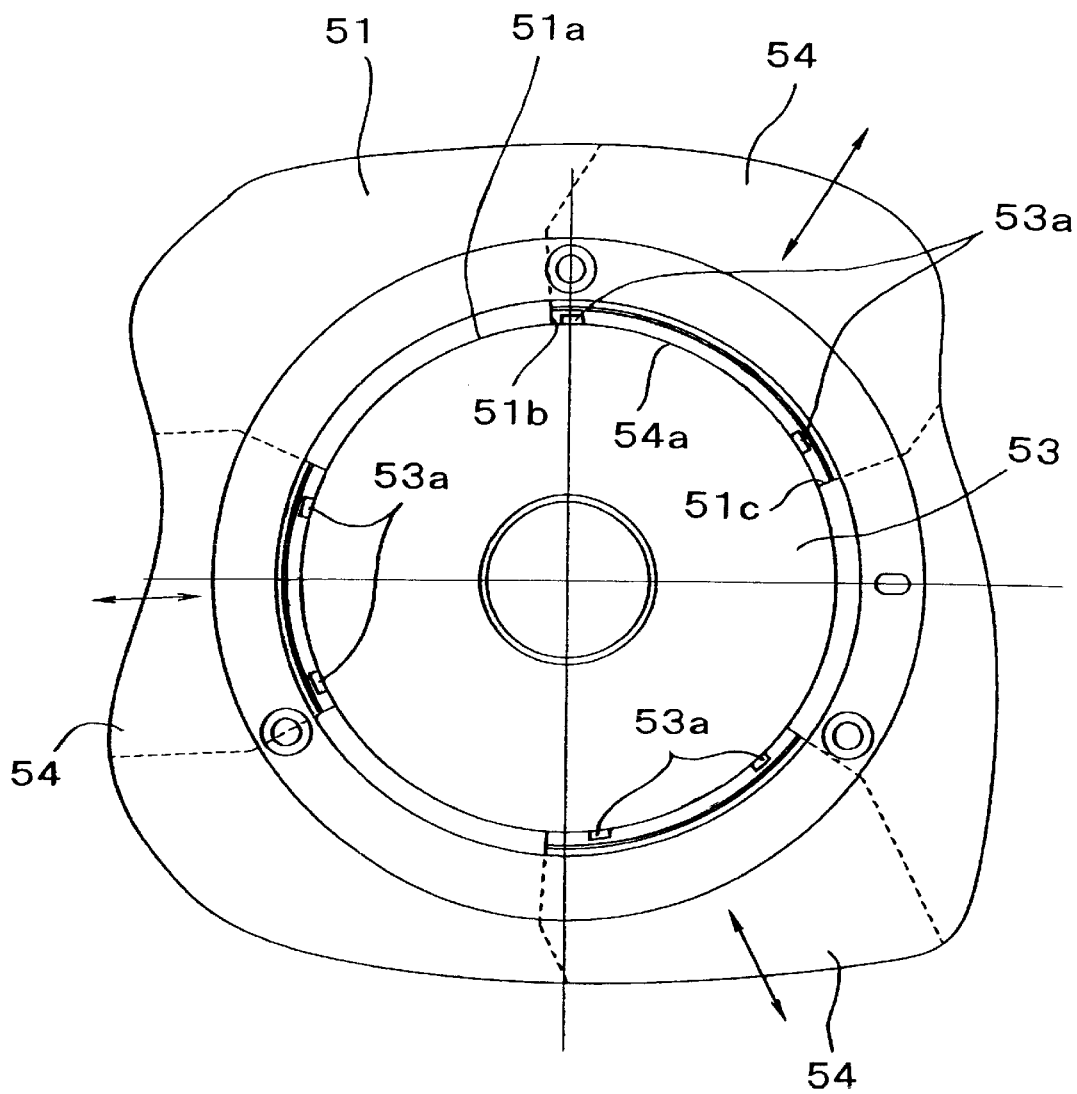
FIG. 5 shows the die utilized to achieve the first embodiment, viewed along the direction indicated by the arrow D1 in FIG. 4A.

FIG. 5 shows the die viewed along the direction indicated by an the arrow D1 in FIG. 4A. The sliding dies 54 each slide in the direction indicated by the arrow. As explained above, the reinforcement ring 2 is fitted so as to place the tab end surfaces 2d and 2e (see FIG. 3C) of one of the tab reinforcements 2a in contact with the end surfaces of 51b and 51c of the fixed die 51. This structure specifically does not require the other two tab reinforcements to be in contact with the fixed die 51. Namely, the position of the reinforcement ring 2 along the rotational direction is regulated by one tab reinforcement 2a and the end surfaces 51b and 51c of the fixed die 51. As a result, while the tab ends 2d and 2e of the reinforcement ring 2 are exposed at the tab ends 1f and 1d at the two ends of one of the tab portions 1a, the tab end surfaces of the tab reinforcements 2a are covered with mold members 1j and 1k at the ends of the other two tab portions, as illustrated in FIG. 1B.

The six projecting portions 53a are set as shown in FIG. 5 at the fixed-side center core 53. It is to be noted that FIG. 5 shows the projecting portions 53a to facilitate the explanation although the projecting portions 53a provided at the fixed-side center core 53 are actually hidden by the sliding dies 54 when the sliding dies 54 are lowered to hold the reinforcement ring 2. In addition, the fixed dies 51 and the sliding dies 54 include arched end surfaces 51a and 54a respectively. Thus, the entire surface of the cylindrical portion 2c of the reinforcement ring 2 is covered by the end surfaces 51a of the fixed dies 51 and the end surfaces 54a of the sliding dies 54 to prevent the molding material from adhering to the surface of the cylindrical portion.

As described above, by adopting the first embodiment in which the reinforcement ring 2 is embedded at the mount main body 1 with ease through insert-molding, a bayonet mount achieving a degree of strength equivalent to that achieved by a metal bayonet mount is manufactured at low cost. In addition, the bayonet mount is manufactured with ease through insert-molding which eliminates the necessity for implementing the assembly process for the mount main body and the like.

Furthermore, the position of the reinforcement ring 2 is regulated along the radial direction, the rotational direction and the direction along the optical axis by using tab reinforcements 2a and the cylindrical portion 2c of the reinforcement ring 2, the position of the metal member relative to the mount main body can be set with further ease and with a higher degree of accuracy.

(Second Embodiment)

An example in which the position of the reinforcement ring 2 along the rotational direction is regulated by using the tab end surfaces 2d and 2e of a tab reinforcement 2a and the end surfaces 51b and 51c of a fixed die 51 is explained in reference to the first embodiment. Alternatively, accurate positional regulation may be achieved along the rotational direction when inserting the reinforcement ring 2 at the mounting tool 55. In the second embodiment, the position of the reinforcement ring 2 along the rotational direction is regulated by utilizing a mounting tool 55 which includes the sleeve 56. The following explanation of the second embodiment is given in reference to FIG. 4 illustrating the first embodiment since it only differs from the first embodiment in part in the flow of the die operation and also in part in the structures of the mounting tool 55 and the sleeve 56.

The following is an explanation of the method adopted in the second embodiment for mounting the reinforcement ring 2 and the flow of the die operation during the insert-molding process achieved in the second embodiment.

(1) The fixed-side center core 53 is made to retreat by 0.3 mm along the direction indicated by the arrow D1 while the die is open.

(2) The reinforcement ring 2 is inserted at the mounting tool 55 which is provided with the sleeve 56. The reinforcement ring 2 is inserted at this time by setting its position relative to the mounting tool 55 along the rotational direction with the end surfaces (end surfaces corresponding to the tab end surfaces 2e and 2d of a tab reinforcement 2a) of one of the slip-stop portions 2b. While the position of the reinforcement ring 2 along the rotational direction is roughly set at this time in the first embodiment, the position along the rotational direction is accurately set in the second embodiment. This is achieved by providing the sleeve 56 with projections that interlock with the end surfaces of the slip-stop portion 2b. The position of the reinforcement ring 2 relative to the die along the rotational direction is thus regulated. The slip-stop portion used during this process is the upper right slip-stop portion 2b in FIG. 3A. It is to be noted that the position of the reinforcement ring 2 along the rotational direction may be determined by using the tab end surfaces 2e and 2d of a tab reinforcement 2a, instead.

(3) Then, the reinforcement ring 2 is inserted further inward by 0.3 mm together with the mounting tool 55 along the direction indicated by the arrow D2 from the home position (see FIG. 4A).

(4) The sliding dies 54 are advanced forward along the direction indicated by the arrow D3 by using an air cylinder. The sliding dies 54 regulate the position along the radial direction by holding the cylindrical portion 2c of the reinforcement ring 2 from the external circumference (see FIG. 4B).

(5) By moving the fixed-side center core 53 by 0.3 mm along the direction indicated by the arrow D6, a projected portion 53a of the fixed-side center core 53 is made to hold the tab reinforcement 2a of the reinforcement ring 2. The position of the reinforcement ring 2 along the direction of the optical axis is thus regulated. At the same time, the projecting portion 53a of the fixed-side center core 53 fixes the position of the tab reinforcement 2a by clamping the tab reinforcement 2a of the reinforcement ring 2 between the sliding dies 54 and itself.

(6) By using the sleeve 56, the reinforcement ring 2 is disengaged from the mounting tool 55 and the mounting tool 55 and the sleeve 56 are taken out of the die while leaving the reinforcement ring 2 inside the die. At this time, since the tab reinforcement 2a of the reinforcement ring 2 is clamped between the projecting portion 53a of the fixed-side center core 53 and the sliding dies 54 and is thus secured, the position of the reinforcement ring 2 along the rotational direction is continuously regulated. In other words, at this point, the position of the reinforcement ring 2 is regulated along the direction in which the optical axis extends, the radial direction and the rotational direction. Thus, it is secured at a specific position relative to the die.

(5) The movable die component 52 is moved along the direction indicated by the arrow D5, thus closing the die (see FIG. 4C).

(6) The die is then filled with resin in the state described above to mold the main body 1 and the reinforcement ring 2 as an integrated unit, thereby completing the process of manufacturing the bayonet mount 10.

As described above, by adopting the second embodiment in which accurate positional regulation is achieved along the rotational direction when inserting the reinforcement ring 2 at the mounting tool 55, the process of inserting the reinforcement ring 2 mounted at the mounting tool 55 into the die is facilitated. In other words, the design of the die can be simplified compared to that required in the first embodiment and, at the same time, the process management for bayonet mount production is facilitated.

(Third Embodiment)

The third embodiment differs from the first embodiment in the die used. While the die used in the first embodiment includes the fixed die 51, the movable die 52, the fixed-side center core 53 and the sliding dies 54 (see FIG. 5), the fixed die 51 in the first embodiment is replaced by sliding dies capable of sliding in the die used in the third embodiment.

Figure 6:
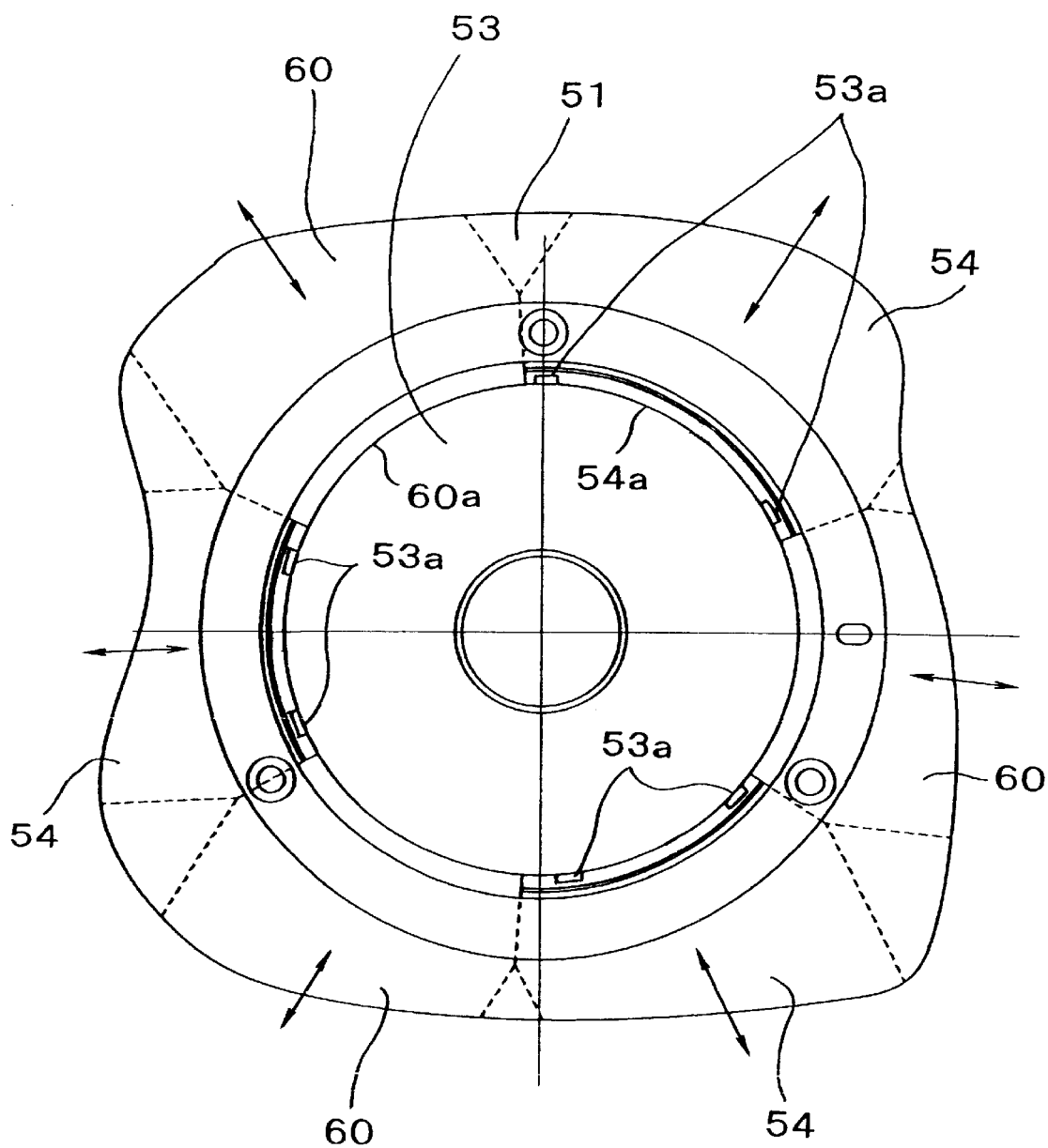
FIG. 6 shows the die utilized to achieve a third embodiment, viewed along the direction indicated by the arrow D1 in FIG. 4A.

FIG. 6 shows the die used in the third embodiment. Since structural features other than the die are identical to those in the first embodiment, an explanation is given by referring to the figures illustrating the first embodiment as necessary. FIG. 6 illustrates the die viewed along the direction indicated by the arrow D1 in FIG. 4A. It differs from the die in FIG. 5 illustrating the first embodiment in that the fixed die 51 in FIG. 5 is replaced with sliding dies 60. The six sliding dies 54 through 60 each slide in the direction indicated by the arrows.

As described above, in the third embodiment having all the dies for regulating the position of the reinforcement ring 2 along the radial direction constituted as sliding dies, the process of inserting the reinforcement ring 2 mounted at the mounting tool 55 into the die is further facilitated. In other words, while the reinforcement ring 2 is inserted in close contact with the fixed die 51 in the first embodiment, the reinforcement ring 2 is inserted with ample play in the third embodiment. As a result, the design of the mechanism through which the reinforcement ring 2 is inserted at the die is simplified, and the process management in the bayonet mount production is facilitated as well.

(Fourth Embodiment)

Figure 7A:
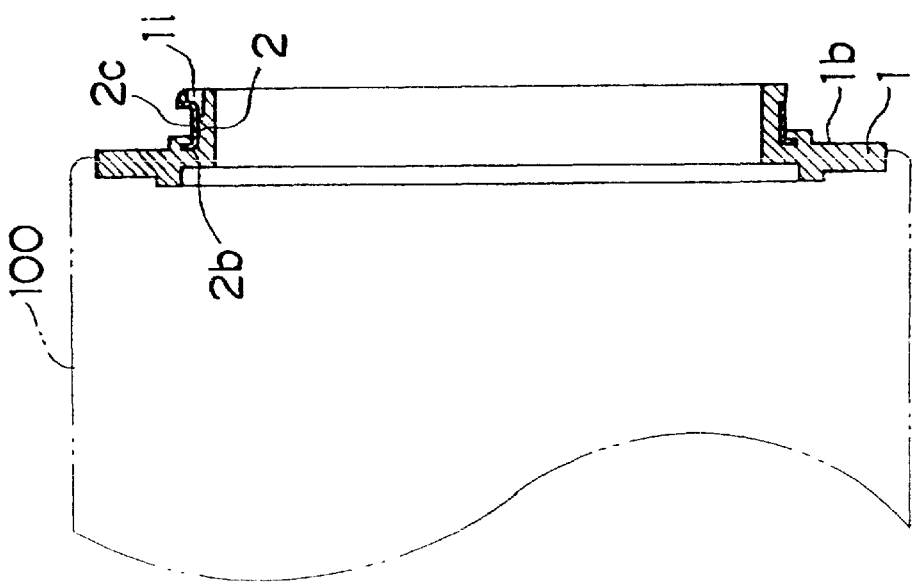
FIG. 7A is a sectional view of a fourth embodiment of the bayonet mount 20 according to the present invention.
Figure 7B:
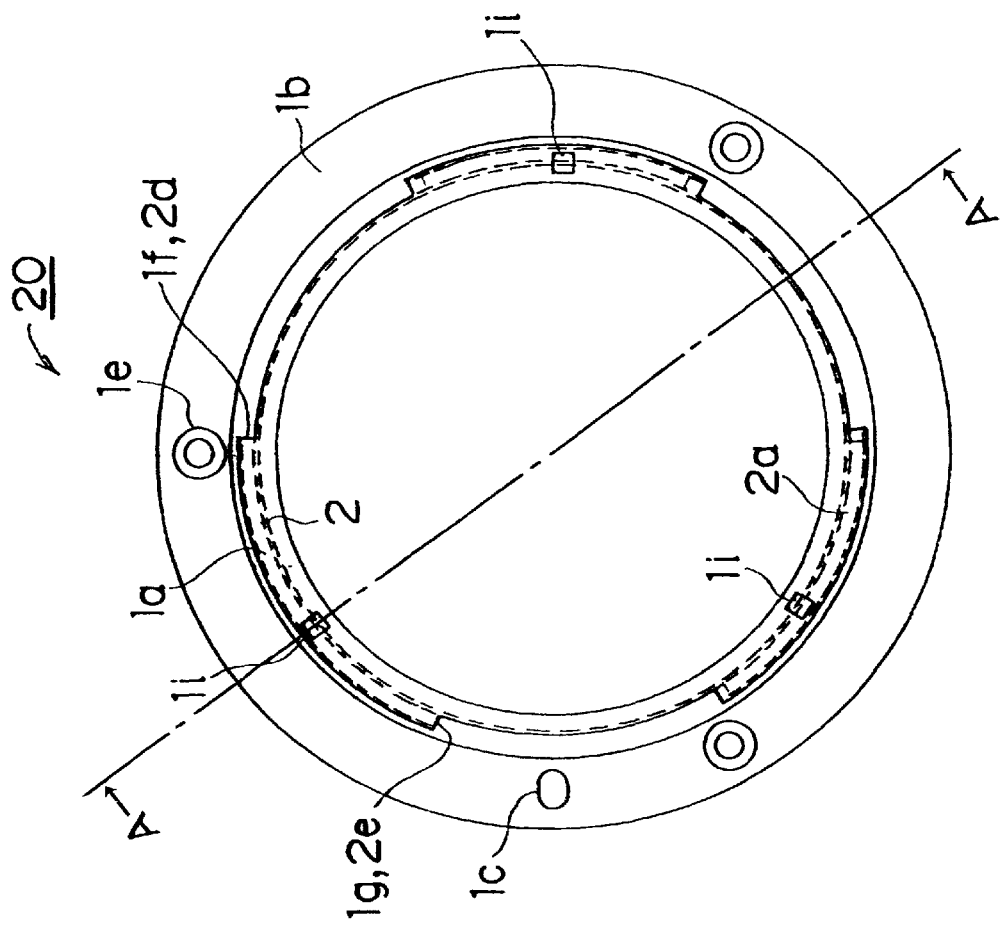
FIG. 7B is a front view of the fourth embodiment of the bayonet mount 20 according to the present invention.
Figure 8:
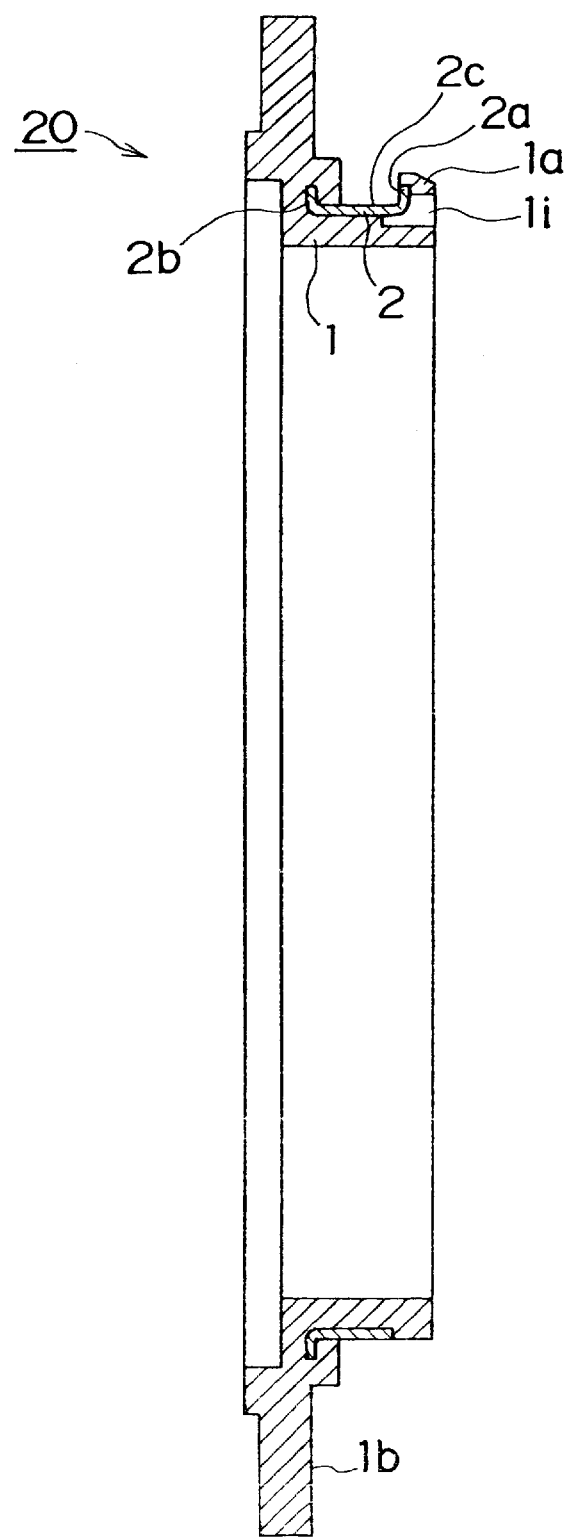
FIG. 8 is an enlargement of FIG. 7A.

FIGS. 7A and 7B respectively present a sectional view and a front view of the fourth embodiment of the bayonet mount 20 according to the present invention. FIG. 7B is a front view of the bayonet mount 20 taken from the camera main body side and FIG. 7A is a sectional view taken along A—A in FIG. 7B. FIG. 8 is an enlargement of FIG. 7A.

Since the bayonet mount 20 in the fourth embodiment is identical to the bayonet mount 10 in the first embodiment except for its holes 1i, the same reference numerals are assigned to identical components to preclude the necessity for a repeated explanation thereof.

The bayonet mount 20 includes three holes 1i provided on the camera main body side that reach the reinforcement ring 2. The holes 1i are left by the projecting portions of the fixed-side center core (not shown) having held the reinforcement ring 2 during the molding process, and unlike in the first embodiment, the holes continue through the internal diameter portion of the reinforcement ring 2. Thus, the projecting portions of the fixed-side center core regulate the position of the reinforcement ring 2 from the internal diameter side as well.

Figure 9:
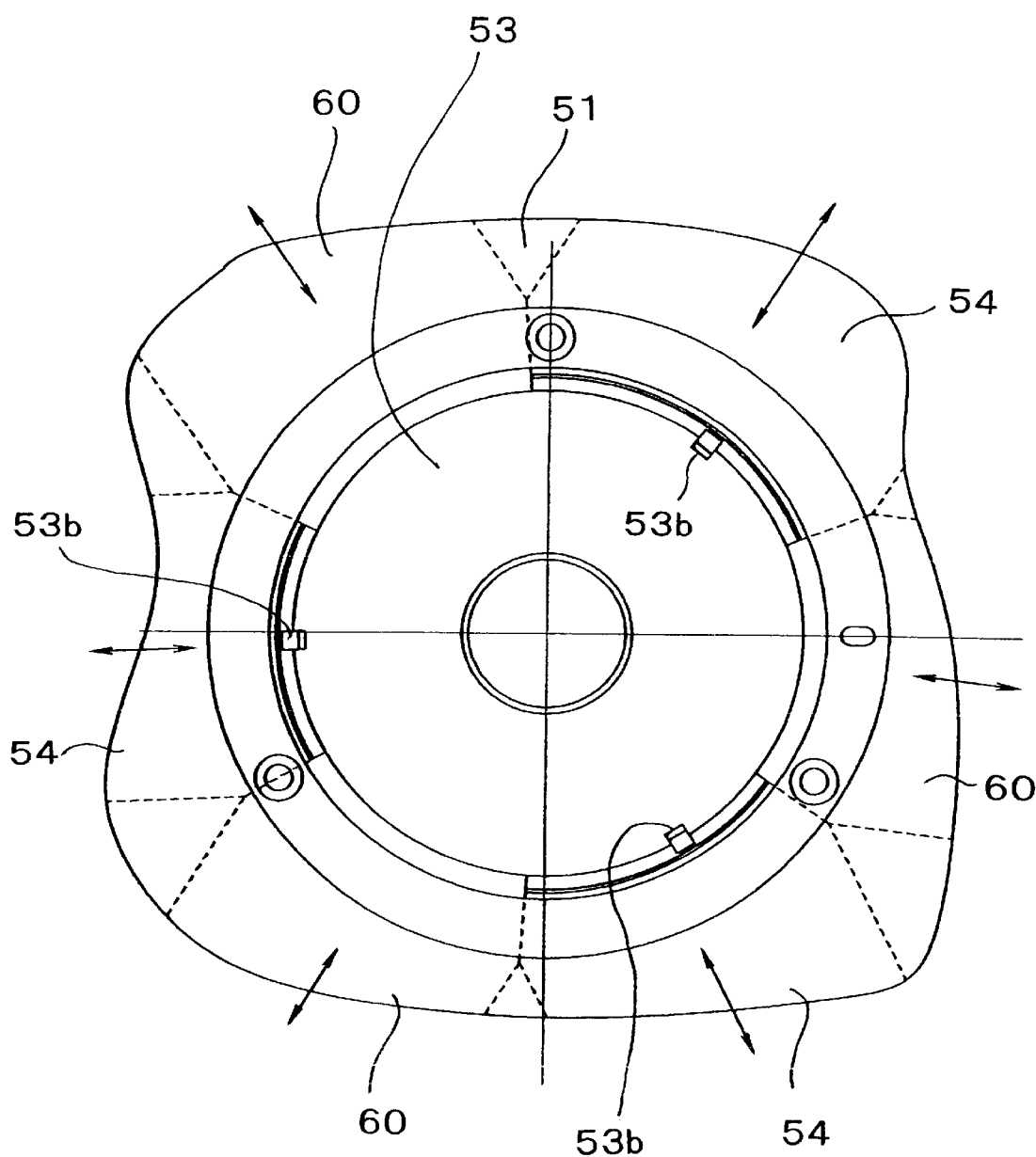
FIG. 9 shows the die used to achieve the fourth embodiment, viewed along the direction indicated by the arrow D1 in FIG. 4A.

FIG. 9 shows the die used in the fourth embodiment viewed along the direction indicated by the arrow D1 in FIG. 4A. The die is identical to the die used in the third embodiment (see FIG. 6), except for its projecting portions 53b at the fixed-side center core. There are three projecting portions 53b as shown in FIG. 9. FIG. 9 shows the projecting portions 53b to facilitate the explanation, although the projecting portions 53b provided at the fixed-side center core 53 are hidden by the sliding dies 54 when the sliding dies 54 are lowered to hold the reinforcement ring 2. It is to be noted that the front ends of the projecting portions 53b have an L-shaped cross section so as to regulate the position of the reinforcement ring 2 along the direction of the optical axis and also along the radial direction from the internal diameter side.

The molding process is implemented as in the first embodiment to complete the production of the bayonet mount 20 formed as shown in FIGS. 7A and 7B.

As described above, by adopting the fourth embodiment in which the positional regulation is implemented from the internal diameter side as well through a method similar to that adopted in the first embodiment, the position of the reinforcement ring 2 is determined with a greater degree of ease and the degree of positional accuracy is further improved while minimizing the production costs as in the first embodiment.

(Fifth Embodiment)

FIGS. 10A–10C show the reinforcement ring 12 achieved in the fifth embodiment. FIG. 10A shows the reinforcement ring 12 viewed from the lens side, FIG. 10B presents a side elevation and FIG. 10C shows the reinforcement ring 2 viewed from the camera main body side. The reinforcement ring 12 is a member achieved by machining stainless steel through press-machining such as drawing, and includes three tab reinforcements 12a on the camera main body side and a continuous slip-stop portion 12b on the lens side.

In the reinforcement ring 12 in the fifth embodiment, a projection 13 is provided at the slip-stop portion 12b in order to regulate the position of the reinforcement ring 12 along the rotational direction. The projection 13 includes end surfaces 13e and 13f and is used to regulate the position of the reinforcement ring 12 along the rotational direction when the reinforcement ring 12 is inserted at the mounting tool 55, as in the second embodiment. The projections that interlock with the end surfaces 13e and 13f of the projection 13 are provided at the sleeve 56. As a result, the position of the reinforcement ring 12 along the rotational direction relative to the die becomes regulated. Since the method adopted to mount the reinforcement ring 12 during the insert-molding process and the molding method adopted in the embodiment are identical to those in the second embodiment, their explanation is omitted.

As described above, since the slip-stop portion 12b at the reinforcement ring 12 is constituted as a continuous portion in the fifth embodiment, even more reliable reinforcement is achieved. In particular, the reinforcement ring 12 becomes separated from the mold member less readily even when a load is applied to the tab portions of the bayonet mount.

(Variations)

The present invention is not limited to the examples presented in the embodiments explained above and it will be understood by those skilled in the art that various changes can be made therein and they are equivalent to the invention.

(1) While the holes 1h or the holes 1i are provided in the embodiments to enable positioning of the reinforcement ring 2 along the direction in which the optical axis extends, the present invention is not limited to this example. Several projecting portions may be formed at the reinforcement ring 2 to be placed in contact with the die. In this structure, no holes are bored and instead, the projecting portions will be exposed at a plurality of positions.

(2) While the reinforcement rings 2 and 12 are formed through press-machining in the embodiments explained above, the present invention is not limited to this example. For instance, the reinforcement ring 2 may be formed through planing or through die casting.

(3) While the present invention is adopted in an interchangeable lens mount in the embodiments described above, the present invention is not limited to this example. For instance, it may be adopted in an intermediate ring or the like, or at may be adopted in a mount provided at the camera main body. Moreover, it may be adopted in an application other than a camera.

(4) While the reinforcement ring 2 is formed as an integrated part through insert-molding in the embodiments explained above, the present invention is not limited to this example. It may be, for instance, retained with screws or it may be bonded, instead.

(5) While the present invention is adopted in a bayonet mount used in a camera in the embodiments explained above, the present invention is not limited to this example. It may be adopted in all situations in which a given member is connected to another member through a method similar to bayonet mounting.

(6) While the present invention is adopted in a male bayonet mount in the embodiments explained above, the present invention is not limited to this example. It may be adopted in a female bayonet mount, instead.

(7) While the position along the rotational direction is regulated by using a single tab reinforcement 2a of a male bayonet mount in the first embodiment of the present invention, the present invention is not limited to this example. It may be adopted to regulate the position by using a plurality of tab reinforcements or it may be adopted to regulate the position by combining the ends of a plurality of tab reinforcements. In other words, all modes in which the position along the rotational direction is regulated by using a tab reinforcement are within the scope of the present invention.

What is claimed is:

1. A bayonet mount comprising:

a mount main body made of resin including a bayonet tab made of resin provided along a direction of a circumference of said mount main body; and a metal member to partially reinforce said bayonet tab at said mount main body and including a tab reinforcement to reinforce said bayonet tab and a cylindrical reinforcement formed in a cylindrical shape around said mount main body, said tab reinforcement projecting out along a radial direction from a central axis of said cylindrical shape at an end surface of said cylindrical reinforcement, said cylindrical reinforcement and said tab reinforcement being formed as an integrated unit and said metal member being embedded in said mount main body.

2. A bayonet mount according to claim 1, wherein:

said bayonet tab comprises a plurality of bayonet tab portions extending therefrom, and said tab reinforcement comprises a plurality of tab reinforcement portions to reinforce said plurality of bayonet tab portions, said plurality of tab reinforcement portions being formed as an integrated part.

3. A bayonet mount according to claim 2, wherein:

said metal member includes a plurality of slip-stop portions facing opposite said plurality of tab reinforcement portions, and said plurality of tab reinforcement portions and said plurality of slip-stop portions are formed as an integrated unit.

4. A bayonet mount according to claim 2, wherein:

said metal member includes a slip-stop portion facing opposite said plurality of tab reinforcement portions, and said slip-stop portion is formed continuously along the direction of the circumference of said mount main body.

5. A bayonet mount according to claim 1, wherein:

at least a part of said cylindrical reinforcement is exposed outside of said mount main body.

6. A bayonet mount according to claim 1, wherein:

an end of said tab reinforcement along the direction of the circumference of said mount main body is exposed outside of said mount main body.

* * * * *

UNITED STATES PATENT AND TRADEMARK OFFICE
CERTIFICATE OF CORRECTION

PATENT NO.    : 6,554,503 B2
DATED         : April 29, 2003
INVENTOR(S)   : Hitoshi Imanari et al.

It is certified that error appears in the above-identified patent and that said Letters Patent is hereby corrected as shown below:

<u>Title page,</u>
Item [73], Assignee, change "Nikon, Corporation" to -- Nikon Corporation --.

Signed and Sealed this

Sixteenth Day of September, 2003

JAMES E. ROGAN
*Director of the United States Patent and Trademark Office*